(12) United States Patent
Yoshihara et al.

(10) Patent No.: US 6,600,544 B2
(45) Date of Patent: Jul. 29, 2003

(54) LIQUID CRYSTAL DISPLAY DEVICE

(75) Inventors: Toshiaki Yoshihara, Kawasaki (JP); Keiichi Betsui, Kawasaki (JP); Hironori Shiroto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 47 days.

(21) Appl. No.: 10/027,452

(22) Filed: Dec. 20, 2001

(65) Prior Publication Data
US 2003/0011739 A1 Jan. 16, 2003

(30) Foreign Application Priority Data

Jul. 16, 2001 (JP) ........................................ 2001-215740

(51) Int. Cl.$^7$ ................................................ G02F 1/13
(52) U.S. Cl. ........................ 349/172; 349/171; 349/184
(58) Field of Search ................................ 349/171, 172, 349/184

(56) References Cited

U.S. PATENT DOCUMENTS 5,541,747 A * 7/1996 Nishi et al. ................... 349/49
5,729,314 A * 3/1998 Tsukamoto et al. ......... 349/122
6,069,602 A * 5/2000 Tanaka et al. ................ 345/89

\* cited by examiner

Primary Examiner—Julie Ngo
(74) Attorney, Agent, or Firm—Greer, Burns & Crain, Ltd.

(57) ABSTRACT

A liquid crystal layer is formed by filing the space between alignment films formed on two glass substrates, respectively, with a ferroelectric liquid crystal having spontaneous polarization. When the maximum charge amount injected to each pixel by the switching of a switching element, the area of each pixel electrode and the magnitude of the spontaneous polarization of the ferroelectric liquid crystal per unit area are denoted as Q, A, and $P_S$, respectively, the relation $2P_S \cdot A > Q$ is established. A cone angle $2\theta$ ($\theta$: tilt angle) of the ferroelectric liquid crystal is not smaller than 45°. It is possible to use a liquid crystal material having large spontaneous polarization, and a high-speed response is realized even when a low voltage is applied to the liquid crystal material.

16 Claims, 13 Drawing Sheets

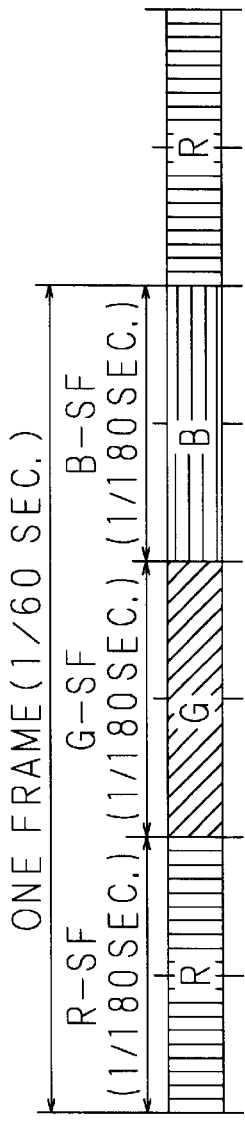
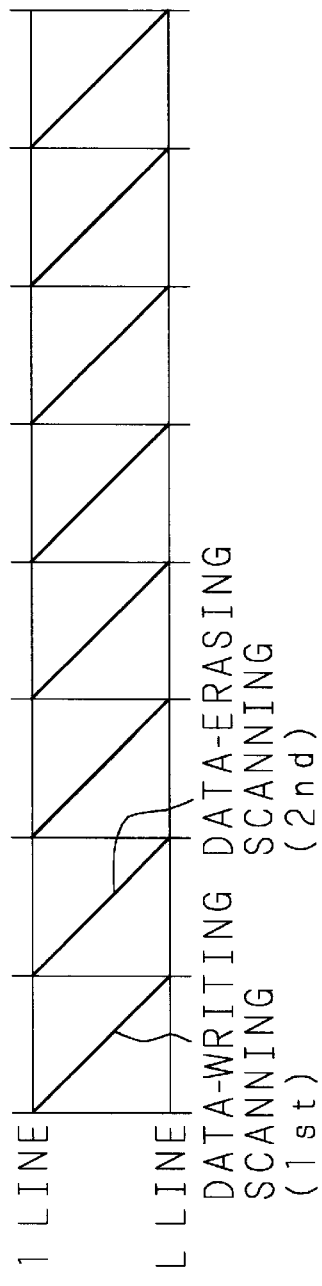
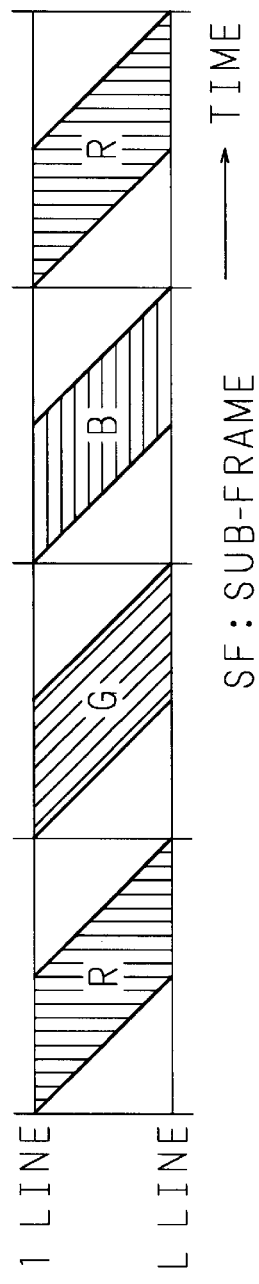
FIG. 9

LIQUID CRYSTAL DISPLAY DEVICE

BACKGROUND OF THE INVENTION

The present invention relates to a liquid crystal display device that uses a liquid crystal material having spontaneous polarization and displays an image by driving a switching element to be on/off.

Along with the recent development of so-called information-oriented society, electronic apparatuses, such as personal computers and PDA (Personal Digital Assistants), have been widely used. Further, with the spread of such electronic apparatuses, portable apparatuses that can be used in offices as well as outdoors have been used, and there are demands for small-size and light-weight of these apparatuses. Liquid crystal display devices have been widely used as one of the means to satisfy such demands. Liquid crystal display devices not only achieve small size and light weight, but also include an indispensable technique in an attempt to achieve low power consumption in portable electronic apparatuses that are driven by batteries.

By the way, the liquid crystal display devices are mainly classified into the reflection type and the transmission type. In the reflection type liquid crystal display devices, light rays incident from the front face of a liquid crystal panel are reflected by the rear face of the liquid crystal panel, and an image is visualized by the reflected light; whereas in the transmission type liquid crystal display devices, the image is visualized by the transmitted light from a light source (back-light) positioned on the rear face of the liquid crystal panel. Since the reflection type liquid crystal display devices have poor visibility resulting from the reflected light amount that varies depending on environmental conditions, transmission type liquid crystal display devices are generally used as display devices of, particularly, personal computers displaying a multi-color or full-color image.

In addition, the current color liquid crystal display devices are generally classified into the STN (Super Twisted Nematic) type and the TFT-TN (Thin Film Transistor-Twisted Nematic) type, based on the liquid crystal materials to be used. The STN type liquid crystal display devices have comparatively low production costs, but they are not suitable for the display of a moving image because they are susceptible to crosstalk and comparatively slow in the response speed. In contrast, the TFT-TN type liquid crystal display devices have better display quality than the STN type, but they require a back-light with high intensity because the light transmittance of the liquid crystal panel is only 4% or so at present. For this reason, in the TFT-TN type liquid crystal display devices, a lot of power is consumed by the back-light, and there would be a problem when used with a portable battery power source. Moreover, since a color image is displayed using a color filter, a single pixel must be constructed by three sub-pixels, and thus there are problems that it is difficult to achieve high definition and the purity of display color is not sufficient.

In order to solve the above problems, the present inventors et al. have developed a liquid crystal display device employing a field-sequential method. The liquid crystal display device employing a field-sequential method can easily realize a more definite display compared with a liquid crystal display device employing a color-filter method because it does not require sub-pixels, and it can also realize display color of excellent purity because the color of emitted light from a light source can be used directly for display without using a color filter. Moreover, since the utilization efficiency of light is high, the liquid crystal display device employing a field-sequential method has the advantage of low power consumption. However, in order to realize a liquid crystal display device employing a field-sequential method, a high-speed responsiveness of liquid crystal is essential. Therefore, in order to achieve a high-speed response of a liquid crystal display device employing a field-sequential method having the above-described advantage or of a liquid crystal display device employing a color-filter method, the present inventors et al. are carrying out the research and development on the driving of a liquid crystal, such as a ferroelectric liquid crystal having spontaneous polarization, which is expected to achieve a response at a speed 100 to 1000 times higher than a conventional speed, by a switching element such as a TFT (Thin Film Transistor).

In the ferroelectric liquid crystal, as shown in FIG. 1, the long axis direction of the liquid crystal molecules changes by only 2θ with the application of a voltage. The intensity of transmitted light is changed by sandwiching a liquid crystal panel holding a ferroelectric liquid crystal therein by two polarizers whose polarization axes cross each other at a right angle and by using birefringence caused by a change of the liquid crystal molecules in the long axis direction. When the ferroelectric liquid crystal is driven by a switching element such as a TFT, the spontaneous polarization is switched according to the charge amount injected (stored) in a pixel through the switching element and the intensity of transmitted light changes.

By the way, in a conventional liquid crystal display device in which a liquid crystal such as a ferroelectric liquid crystal having spontaneous polarization is driven by a switching element such as a TFT, $2P_S \cdot A$ (the total charge amount of a switching current resulting from complete reversal of spontaneous polarization), where $P_S$ is the magnitude of spontaneous polarization per unit area and A is the electrode area of each pixel, is not larger than a charge amount Q to be charged in each pixel through a switching element. In other words, in order to satisfy the condition $2P_S \cdot A \leq Q$, the liquid crystal material, pixel electrode, TFT, etc. are designed.

In the conventional example, as described above, the cone angle 2θ (θ: tilt angle) of the liquid crystal is set at 45° or less, the spontaneous polarization is completely reversed under the condition of $2P_S \cdot A \leq Q$, and the maximum intensity of transmitted light is obtained. Therefore, with the application of a voltage of not higher than 7 V, the magnitude $P_S$ of spontaneous polarization that satisfies the above-described condition is reduced to 8 nC/cm$^2$ or less, and a slow responsiveness will result because $P_S$ is not increased much, and there is demand for an increase in the magnitude of spontaneous polarization in view of the responsiveness, particularly the responsiveness at low temperature. Moreover, there is a problem that the degree of freedom in selecting a liquid crystal material is low. Due to the relation between the responsiveness and the selectable liquid crystal material, when a liquid crystal material having large spontaneous polarization is used, Q must be increased, resulting in a problem of an increase of the applied voltage. Furthermore, as shown in FIG. 2, at near end of the switching of spontaneous polarization, since the change of the optical axis due to the reversal of liquid crystal is small, the proportion of the change of the intensity of transmitted light due to the increase of the applied voltage becomes smaller, and therefore a high applied voltage is required in order to obtain the maximum intensity of transmitted light.

BRIEF SUMMARY OF THE INVENTION

A principal object of the present invention is to provide a liquid crystal display device capable of using a liquid crystal material having large spontaneous polarization and decreasing the applied voltage to the liquid crystal material to a low voltage.

A liquid crystal display device of the first aspect is a liquid crystal display device comprising a liquid crystal material having spontaneous polarization between two substrates facing each other; and a plurality of electrodes and switching elements provided on an inner face of one of the substrates so that the electrodes and switching elements correspond to pixels, respectively, wherein a maximum charge amount injected to each pixel by the switching of each switching element is smaller than a total charge amount of a switching current per each pixel resulting from complete reversal of spontaneous polarization of the liquid crystal material.

A liquid crystal display device of the second aspect is a liquid crystal display device comprising a liquid crystal material having spontaneous polarization between two substrates facing each other; and a plurality of electrodes and switching elements provided on an inner face of one of the substrates so that the electrodes and switching elements correspond to pixels, respectively, wherein the liquid crystal display device satisfies a relation $2P_S \cdot A > Q$, where Q is a maximum charge amount injected to each of the pixels by switching of each switching element, A is an area of each of the electrodes, and $P_S$ is a magnitude of spontaneous polarization per unit area.

Conventionally, a liquid crystal material, etc. is designed so that the magnitude $P_S$ of spontaneous polarization satisfies the condition $2P_S \cdot A \leq Q$, and the liquid crystal material is driven so that the spontaneous polarization is completely reversed by the application of a voltage. The present inventors et al. found as the result of studying in detail liquid crystal materials having spontaneous polarization, particularly the behavior of a ferroelectric liquid crystal driven by a TFT, that the ferroelectric liquid crystal can be driven by the TFT even in a condition reverse to the above-mentioned condition, that is, the maximum charge amount injected to each pixel by the switching of the switching element is smaller than the total charge amount of a switching current per pixel resulting from complete reversal of spontaneous polarization of the liquid crystal material, i.e., the condition $2P_S \cdot A > Q$.

Accordingly, in the first and second aspects, an improvement of the responsiveness is achieved by designing a liquid crystal material, etc. to satisfy the condition that the maximum charge amount injected to each pixel by the switching of the switching element is smaller than the total charge amount of the switching current resulting from complete reversal of spontaneous polarization of the liquid crystal material, i.e., the condition $2P_S \cdot A > Q$, so as to increase the spontaneous polarization. Moreover, by providing a display within a range in which the spontaneous polarization is not completely reversed, a portion where the proportion of the change of the intensity of transmitted light due to an increase of the applied voltage becomes smaller at near end of the switching of spontaneous polarization is not used for display, thereby realizing a decrease of the applied voltage.

A liquid crystal display device of the third aspect is based on the first or second aspect, wherein the cone angle of the liquid crystal material is not smaller than 45°. In the third aspect, since the cone angle of the liquid crystal material is not smaller than 45°, it is possible to obtain a more satisfactory characteristic. By making the cone angle not smaller than 45°, the maximum value is present in the relation between the applied voltage and the intensity of transmitted light as shown in FIG. 3. The switching angle of a liquid crystal material exhibiting this maximum value is substantially 45°. Therefore, it is preferred to set the cone angle of the liquid crystal material not to be smaller than 45° and display an image in a region where the intensity of transmitted light is between substantially 0 and substantially maximum. In this case, compared with a conventional liquid crystal device in which the cone angle of the liquid crystal material is made 45° by satisfying $2P_S \cdot A \leq Q$, in a liquid crystal display device of the present invention in which the cone angle of the liquid crystal material is made not smaller than 45° by satisfying $2P_S \cdot A > Q$, since a portion where the proportion of the change of the intensity of transmitted light due to an increase of the applied voltage becomes smaller at near end of the switching of spontaneous polarization is not used for display, it is possible to realize a decrease of the applied voltage.

A liquid crystal display device of the fourth aspect is based on any one of the first through third aspects, wherein the liquid crystal material is a ferroelectric liquid crystal material. In the fourth aspect, since a ferroelectric liquid crystal material is used as the liquid crystal material, it is possible to realize a high-speed responsiveness.

A liquid crystal display device of the fifth aspect is based on any one of the first through fourth aspects, wherein a storage capacity is provided on a liquid crystal material driving electrode side of each switching element. In the fifth aspect, with the presence of this storage capacity, it is possible to increase the maximum charge amount Q, thereby increasing the magnitude $P_S$ of spontaneous polarization per unit area.

A liquid crystal display device of the sixth aspect is based on any one of the first through fifth aspects, wherein a change of an optical axis of the liquid crystal material during driving is not greater than 45°. In the sixth aspect, since the change of an optical axis of the liquid crystal material during driving is not greater than 45°, it is possible to drive the liquid crystal material in a stable manner.

A liquid crystal display device of the seventh aspect is based on any one of the first through fifth aspect, wherein the liquid crystal material is driven within an applied voltage range of 0 to ±V, where V is an applied voltage to the liquid crystal material when the light-transmittance of the liquid crystal material becomes maximum. In the seventh aspect, since the liquid crystal material is driven within the applied voltage range of 0 to V or −V to 0 (V: the voltage applied to the liquid crystal material when the light-transmittance becomes maximum), it is possible to drive the liquid crystal material in a stable manner.

A liquid crystal display device of the eighth aspect is based on the seventh aspect, wherein, if a charge amount injected to each pixel is denoted as q when the applied voltage is +V or −V, a total charge amount of a current flowing due to a response of the liquid crystal material resulting from the applied voltage +V or −V is not more than q. In the eighth aspect, since the liquid crystal material is driven so that the total charge amount of a current flowing due to a response of the liquid crystal is not more than q (q: the charge amount injected to each pixel when the applied voltage is ±V) when the applied voltage is +V or −V, it is possible to drive the liquid crystal material in a stable manner.

A liquid crystal display device of the ninth aspect is based on any one of the first through eighth aspects and further comprises a back-light having a light source for emitting light of two or more colors, wherein a color image is displayed by switching the colors of emitted light of the light source in a time-divided manner in synchronism with on/off driving of the switching element. In the ninth aspect, by comprising the back-light having a light source for emitting light of two or more colors and by switching the colors of emitted light of the light source in a time-divided manner in synchronism with on/off driving of the switching element, it is possible to display a color image by a field-sequential method.

The above and further objects and features of the invention will more fully be apparent from the following detailed description with accompanying drawings.

BRIEF DESCRIPTION OF THE SEVERAL VIEWS OF THE DRAWINGS

FIGS. 9(a), 9(b) and 9(c) show the time chart of display control in the liquid crystal display device;

DETAILED DESCRIPTION OF THE INVENTION

The following description will specifically explain the present invention with reference to the drawings illustrating an embodiment thereof. It should be noted that the present invention is not limited to the following embodiment.

Figure 1:
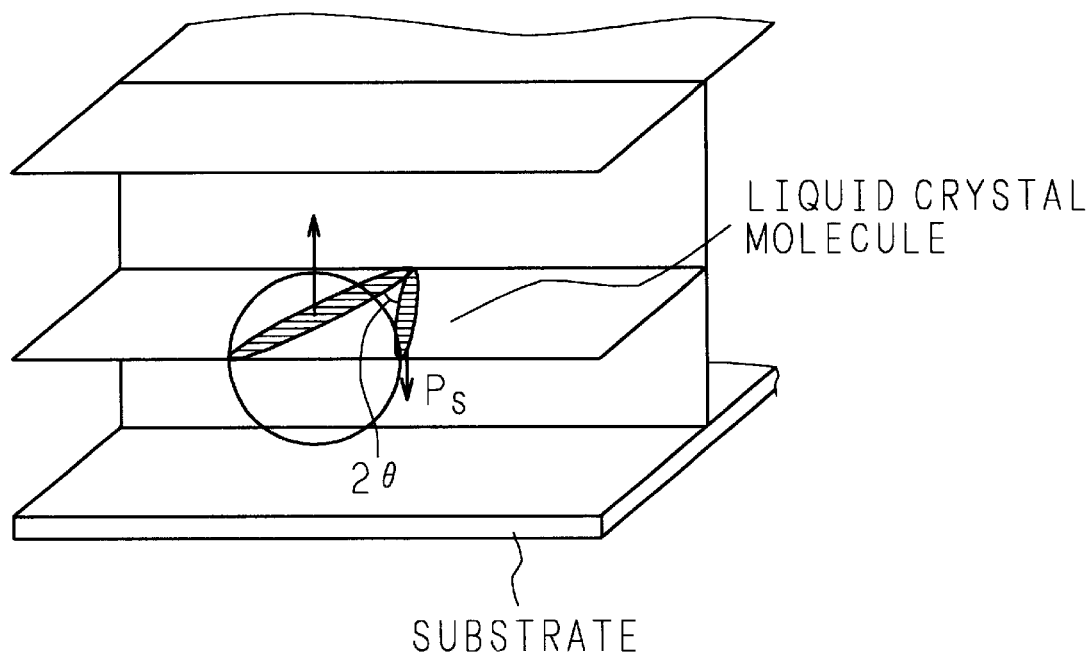
FIG. 1 is a view showing an alignment state of liquid crystal molecules in a ferroelectric liquid crystal panel.
Figure 2:
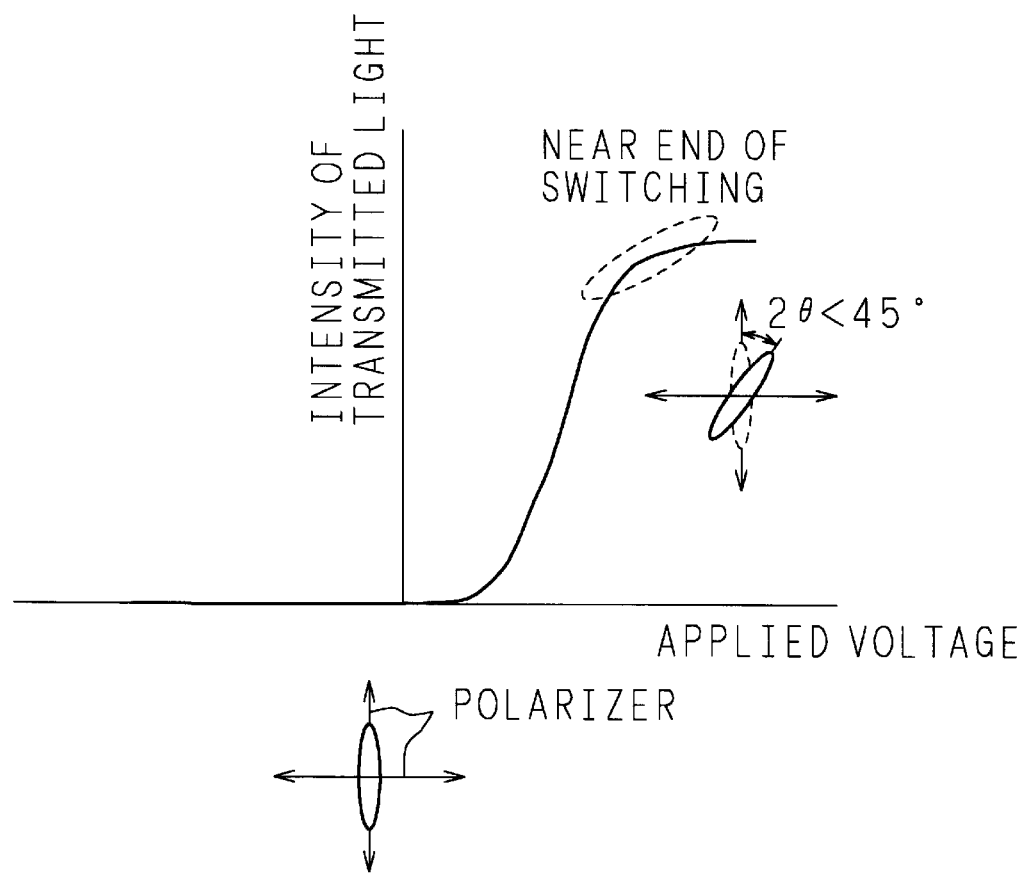
FIG. 2 is a graph showing the applied voltage-transmitted light intensity characteristic of a conventional liquid crystal display device.
Figure 3:
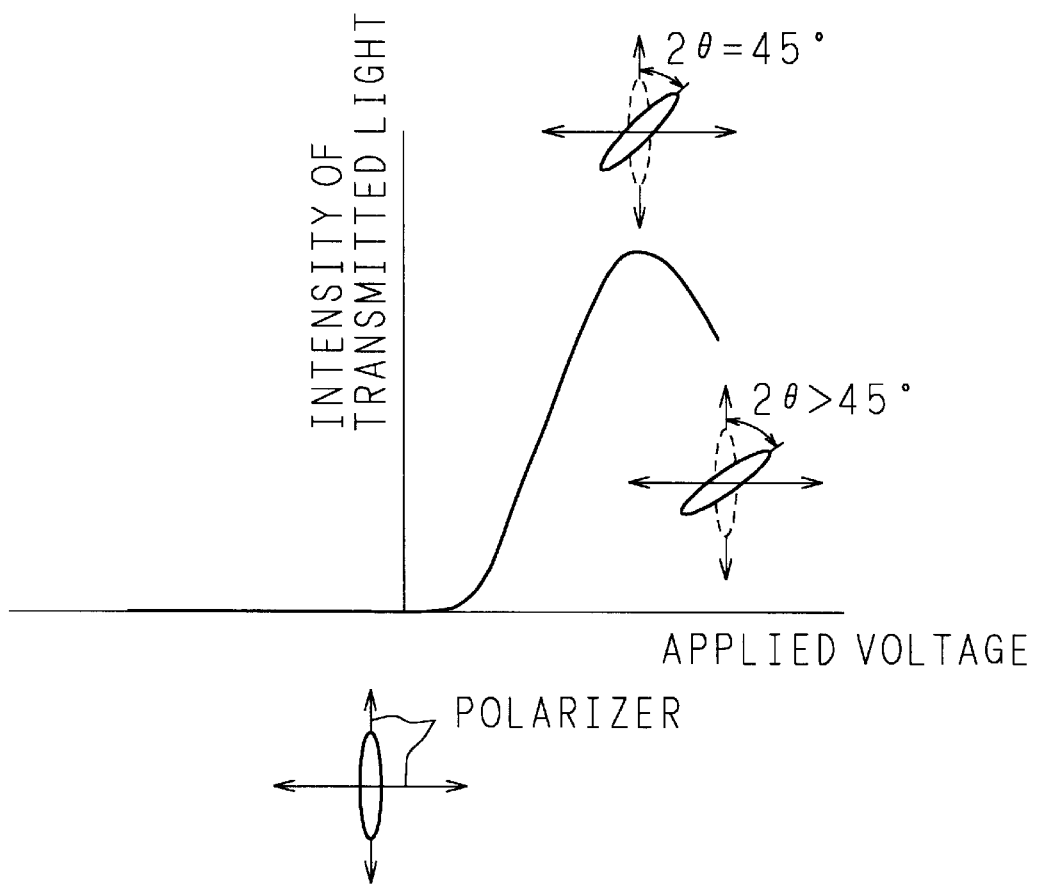
FIG. 3 is a graph showing the applied voltage-transmitted light intensity characteristic of a liquid crystal display device of the present invention.
Figure 4:
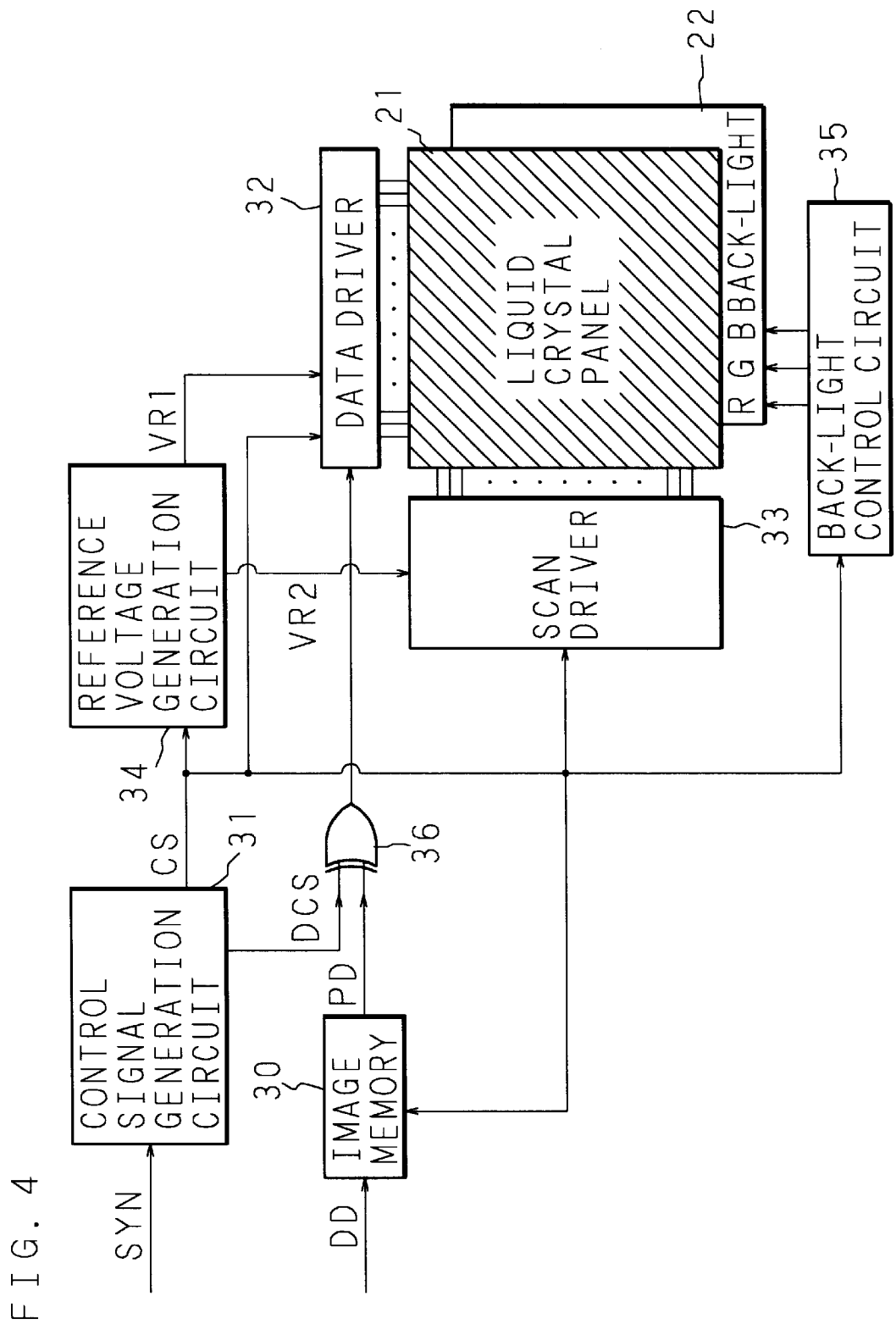
FIG. 4 is a block diagram showing the circuit structure of the liquid crystal display device.
Figure 5:
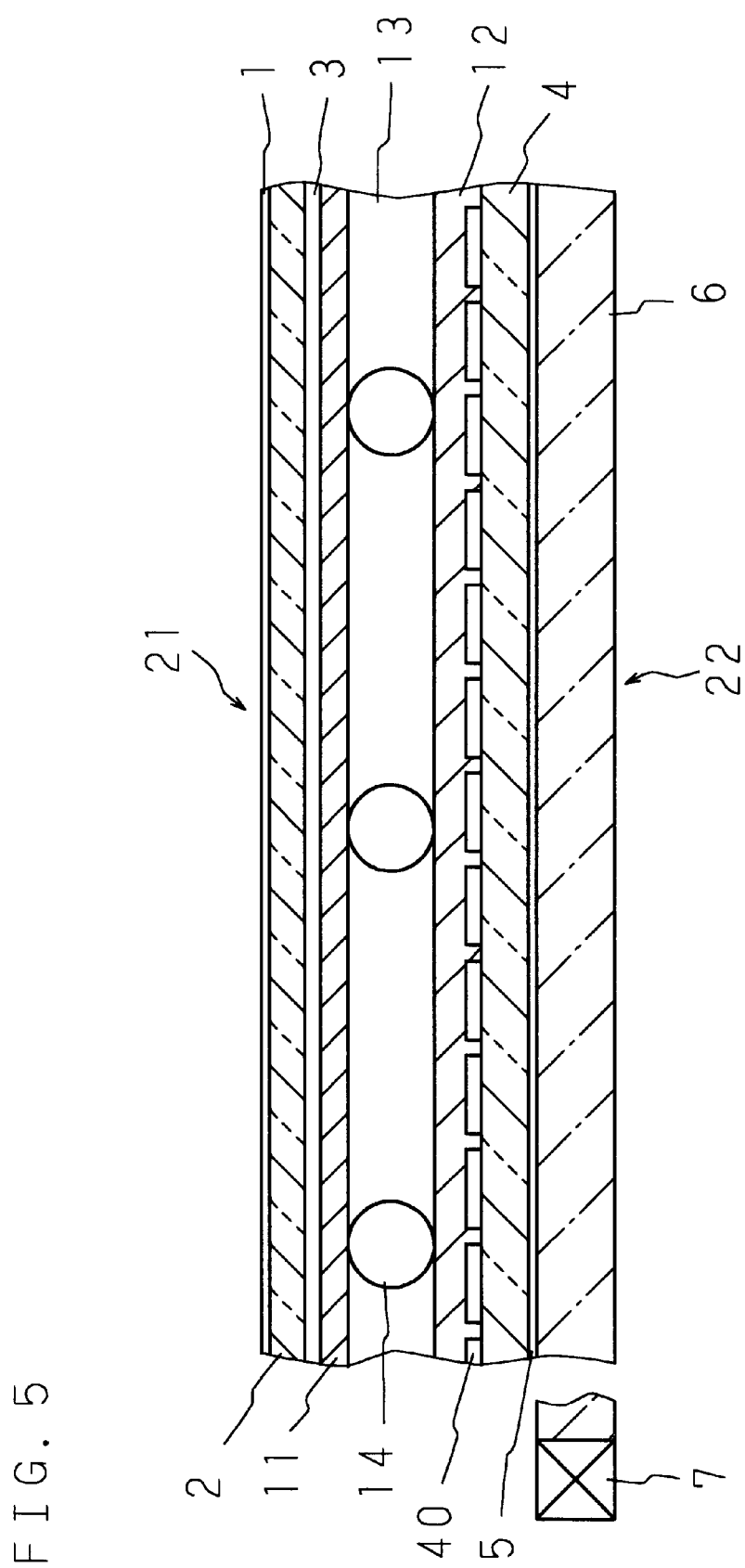
FIG. 5 is a schematic cross sectional view of a liquid crystal panel and a back-light.
Figure 6:
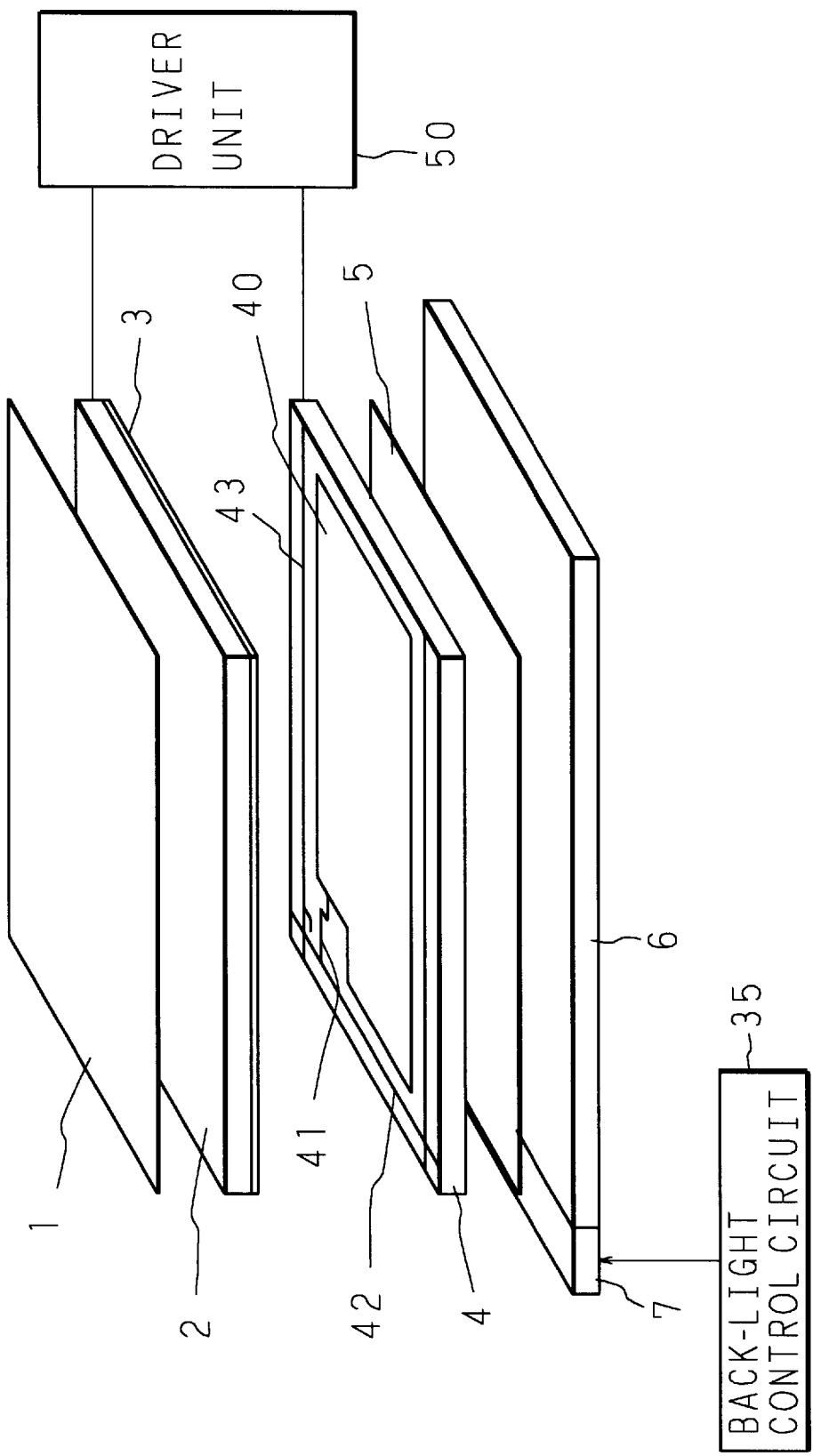
FIG. 6 is a schematic view showing an example of the entire structure of the liquid crystal display device.
Figure 7:
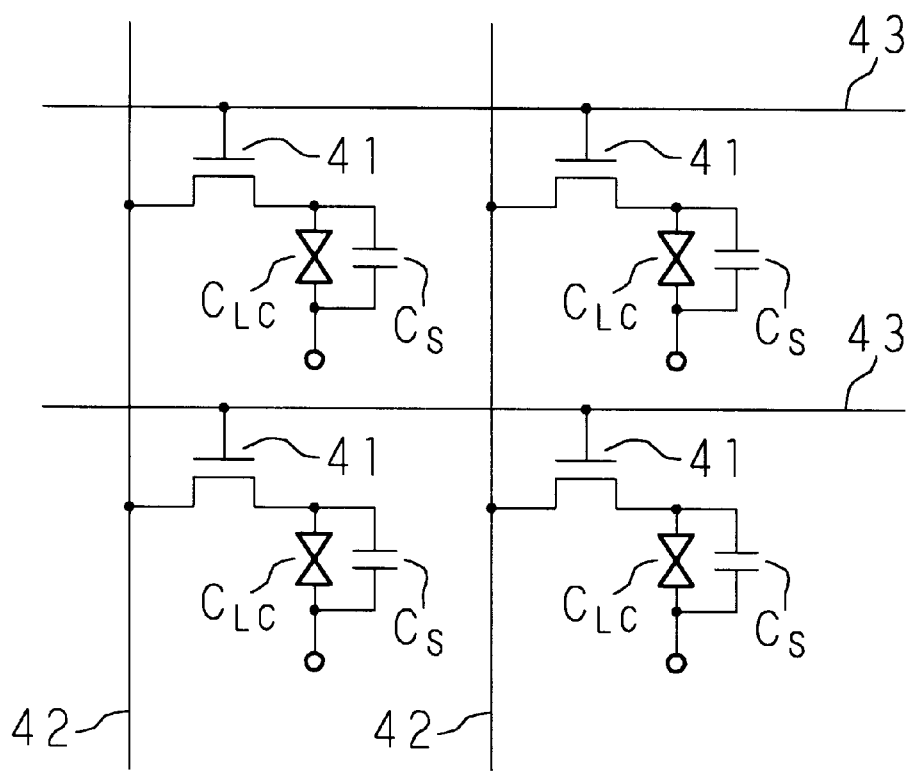
FIG. 7 is a view showing an example of the cell structure of the liquid crystal panel.
Figure 8:
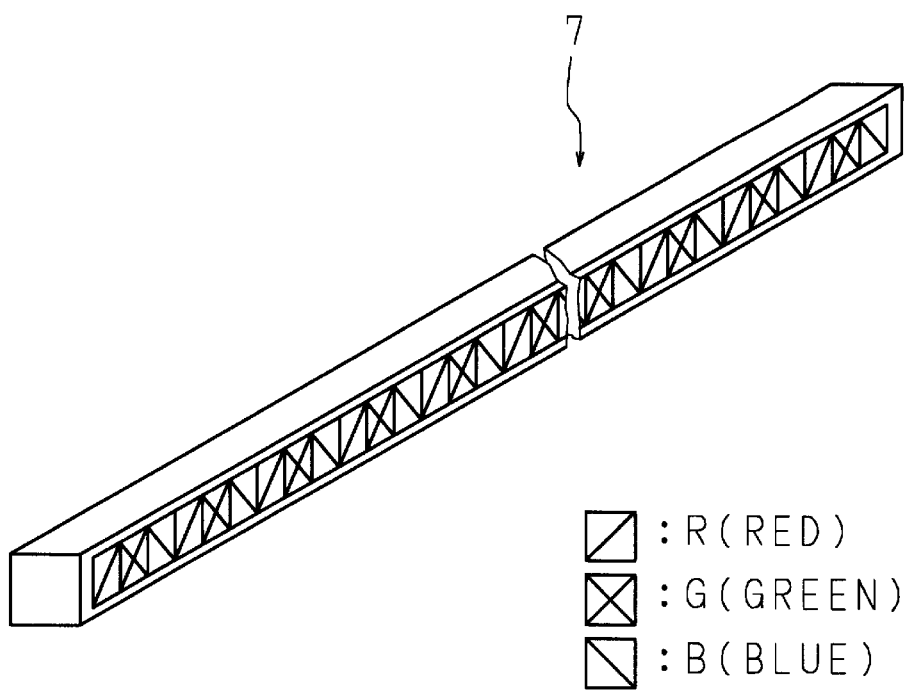
FIG. 8 is an example of the structure of an LED array.

FIG. 4 is a block diagram showing the circuit structure of a liquid crystal display device according to the present invention, FIG. 5 is a schematic cross sectional view of the liquid crystal panel and back-light, FIG. 6 is a schematic view showing an example of the entire structure of the liquid crystal display device, FIG. 7 is a view showing an example of the cell structure of the liquid crystal panel, and FIG. 8 is a view showing an example of the structure of an LED array as a light source of the back-light.

As shown in FIGS. 5 and 6, a liquid crystal panel 21 is constituted by a polarization film 1, a glass substrate 2, a common electrode 3, a glass substrate 4 and a polarization film 5, which are stacked in this order from the upper layer (surface) side to the lower layer (rear face) side, and pixel electrodes 40 arranged in a matrix form are formed on the common electrode 3 side of the glass substrate 4.

A driver unit 50 which is formed by a data driver 32, a scan driver 33, etc. as to be described later is connected between the common electrode 3 and the pixel electrodes 40. The data driver 32 is connected to a TFT (Thin Film Transistor) 41 through a signal line 42, while the scan driver 33 is connected to the TFT 41 through a scanning line 43. The TFT 41 is controlled to be on/off by the scan driver 33. Each pixel electrode 40 is controlled to be on/off by the TFT 41. Therefore, the intensity of transmitted light of each pixel is controlled by a signal given from the data driver 32 through the signal line 42 and the TFT 41. Note that, in order to increase the charge amount injected to each pixel, as shown in FIG. 7, it is also possible to adopt a structure (later-described Example 2) in which a storage capacity $C_S$ is connected to the TFT 41 in parallel with a liquid crystal cell $C_{LC}$.

An alignment film 12 is provided on the upper face of the pixel electrodes 40 on the glass substrate 4 and an alignment film 11 is placed on the lower face of the common electrode 3, and a liquid crystal layer 13 is formed by filling the space between the alignment films 11 and 12 with a liquid crystal material. Further, 14 represents spacers for maintaining a layer thickness of the liquid crystal layer 13.

The back-light 22 is disposed on the lower layer (rear face) side of the liquid crystal panel 21, and has an LED array 7 positioned to face an end face of a light guiding and diffusing plate 6 that forms a light emitting area. As shown in FIG. 8, this LED array 7 comprises LEDs for emitting light of three primary colors, i.e., red (R), green (G) and blue (B), which are sequentially and repeatedly arranged on a surface facing the light guiding and diffusing plate 6. Furthermore, the red, green and blue LEDs are controlled to emit light in red, green and blue sub-frames, respectively, according to a later-described field-sequential method. The light guiding and diffusing plate 6 guides light emitted from each LED of this LED array 7 to its entire surface and diffuses it toward the upper face, thereby functioning as the light emitting area.

In FIG. 4, reference numeral 30 represents an image memory to which display data DD from an external personal computer, for example, is inputted and which stores the inputted display data DD. Reference numeral 31 is a control signal generation circuit to which a synchronous signal SYN is inputted from the same personal computer and which generates a control signal CS and a data conversion control signal DCS. Pixel data PD is outputted from the image memory 30 to a data conversion circuit 36, and the data conversion control signal DCS is also outputted thereto from the control signal generation circuit 31. The data conversion circuit 36 generates inverted pixel data #PD by inverting the inputted pixel data PD in accordance with the data conversion control signal DCS.

Moreover, the control signal CS is outputted from the control signal generation circuit 31 to each of a reference voltage generation circuit 34, data driver 32, scan driver 33, and back-light control circuit 35. The reference voltage generation circuit 34 generates reference voltages VR1 and VR2, and outputs the reference voltages VR1 and VR2 to the data driver 32 and the scan driver 33, respectively. The data driver 32 outputs a signal to the signal lines 42 of the pixel electrodes 40 based on the pixel data PD or inverted pixel data #PD received from the image memory 30 through the data conversion circuit 36. In synchronism with the output of this signal, the scan driver 33 scans sequentially the scanning lines 43 of the pixel electrodes 40 on a line by line basis. Furthermore, the back-light control circuit 35 applies a drive voltage to the back-light 22 so that each of the red, green and blue LEDs of the LED array 7 of the back-light 22 emits light in a time-divided manner.

Next, the operation of the liquid crystal display device of the present invention will be explained. To the image memory 30, display data DD of each of red, green and blue colors to be displayed by the liquid crystal panel 21 is supplied from the personal computer. After storing temporarily the display data DD, the image memory 30 outputs pixel data PD that is the data corresponding to each pixel unit upon receipt of the control signal CS outputted from the control signal generation circuit 31. When the display data DD is supplied to the image memory 30, the synchronous signal SYN is fed to the control signal generation circuit 31, and, upon the input of the synchronous signal SYN, the control signal generation circuit 31 generates and outputs the control signal CS and the data conversion control signal DCS. The pixel data PD outputted from the image memory 30 is supplied to the data conversion circuit 36.

When the data conversion control signal DCS outputted from the control signal generation circuit 31 has the L level, the data conversion circuit 36 passes the pixel data PD as it is. On the other hand, when the data conversion control signal DCS has the H level, the data conversion circuit 36 generates and outputs the inverted pixel data #PD. Thus, in the control signal generation circuit 31, the data conversion control signal DCS is set to be the L level in data-writing scanning, while it is set to be the H level in data-erasing scanning.

The control signal CS generated in the control signal generation circuit 31 is supplied to the data driver 32, scan driver 33, reference voltage generation circuit 34 and back-light control circuit 35. The reference voltage generation circuit 34 generates the reference voltages VR1 and VR2 upon receipt of the control signal CS, and outputs the generated reference voltages VR1 and VR2 to the data driver 32 and the scan driver 33, respectively.

Upon receipt of the control signal CS, the data driver 32 outputs a signal to the signal lines 42 of the pixel electrodes 40 based on the pixel data PD or the inverted pixel data #PD outputted from the image memory 30 through the data conversion circuit 36. Upon receipt of the control signal CS, the scan driver 33 sequentially scans the scanning lines 43 of the pixel electrodes 40 on a line by line basis. In accordance with the output of the signal from the data driver 32 and the scanning by the scan driver 33, the TFT 41 is driven, a voltage is applied to the pixel electrode 40, and the intensity of the transmitted light of the pixel is controlled.

Upon receipt of the control signal CS, the back-light control circuit 35 applies a drive voltage to the back-light 22 so that each of the red, green and blue LEDs of the LED array 7 of the back-light 22 emits light in a time-divided manner.

In this liquid crystal display device, display control is performed according to the time chart of a field-sequential method shown in FIGS. 9(a), 9(b) and 9(c). FIG. 9(a) shows the light-emission timings of the LEDs of the respective colors of the back-light 22, FIG. 9(b) shows the scanning timing of each line of the liquid crystal panel 21, and FIG. 9(c) shows the coloring state of the liquid crystal panel 21. In this example, 60 frames are displayed in one second. Accordingly, one frame period is 1/60 second, and this one frame period is divided into three sub-frames, each having a period of 1/180 second.

Then, in each of the first through third sub-frames, the red, green and blue LEDs are controlled to emit light sequentially as shown in FIG. 9(a). By switching the pixels of the liquid crystal panel 21 on a line by line basis in synchronism with such a sequential emission of light of each color, a color image is displayed. Note that, in this example, while the red light, green light and blue light are emitted in the first sub-frame, the second sub-frame and the third sub-frame, respectively, the sequence of these colors is not necessarily limited to the red, green and blue order, and other sequence may be used.

Meanwhile, as shown in FIG. 9(b), with respect to the liquid crystal panel 21, data scanning is performed twice in each of the red, green and blue sub-frames. However, the timing is adjusted so that the first scanning (data-writing scanning) start timing (timing to the first line) coincides with the start timing of each sub-frame and the second scanning (data-erasing scanning) end timing (timing to the last line) coincides with the end timing of each sub-frame.

During the data-writing scanning, a voltage corresponding to the pixel data PD is applied to each pixel of the liquid crystal panel 21 to adjust the light-transmittance. Accordingly, it is possible to display a full-color image. Moreover, during the data-erasing scanning, a voltage which is the same as but has an opposite polarity to the voltage in the data-writing scanning is applied to each pixel of the liquid crystal panel 21 so as to erase the display of each pixel of the liquid crystal panel 21, thereby preventing the application of a direct-current component to the liquid crystal.

The liquid crystal display device of the present invention displays a color image by the field-sequential method in the above-described manner.

EXAMPLE 1

A liquid crystal panel 21 of Example 1 as shown in FIGS. 5 and 6 was fabricated as follows. After washing the TFT substrate having the pixel electrodes 40 (pixel number: 640×480, electrode area A: $6 \times 10^{-5}$ cm$^2$, diagonal: 3.2 inches) and the glass substrate 2 having the common electrode 3, they were coated with polyamide and then baked for one hour at 200° C. so as to form about 200 Å thick polyamide films as the alignment films 11 and 12.

Further, these alignment films 11 and 12 were rubbed with a rayon fabric, and stacked with a gap being maintained therebetween by the spacers 14 made of silica having an average particle size of 1.6 µm so as to fabricate an empty panel. A ferroelectric liquid crystal material based on the specifications of the present invention was sealed in between the alignment films 11 and 12 of this empty panel so as to form the liquid crystal layer 13. The magnitude $P_S$ of spontaneous polarization of the sealed ferroelectric liquid crystal material was 11 nC/cm$^2$, and the cone angle 2θ was 58°. The fabricated panel was sandwiched by two polarization films 1 and 5 maintained in a crossed-Nicol state so that a dark state was produced when the ferroelectric liquid crystal molecules of the liquid crystal layer 13 titled to one direction, thereby forming the liquid crystal panel 21.

Figure 10:
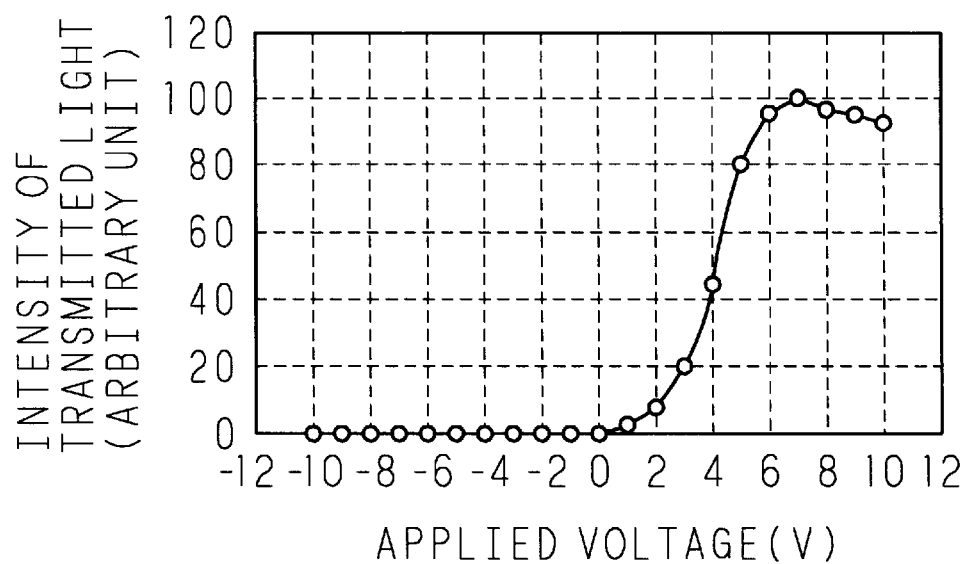
FIG. 10 is a graph showing the applied voltage-transmitted light intensity characteristic according to Example 1.

The graph of FIG. 10 shows the applied voltage-transmitted light intensity characteristic when a voltage was applied to each pixel of the liquid crystal panel 21 thus fabricated through the switching of the TFT 41. The intensity of transmitted light exhibited the maximum when the applied voltage was 7 V It is therefore suitable to drive the liquid crystal by the applied voltage within a range of 0 to 7 V or −7 to 0 V. The charge amount Q injected to each pixel through the switching of the TFT 41 when a voltage of 7 V was applied was calculated 1.26 pC. Since the magnitude $P_S$ of spontaneous polarization is 11 nC/cm² and the area A of the pixel electrode 40 is 6×10⁻⁵ cm², $2P_S \cdot A$=1.32 pC, which satisfies $2P_S \cdot A > Q$.

Moreover, when the applied voltage was 7 V, the total charge amount of a current flowing due to the response of the ferroelectric liquid crystal material was measured 1.01 pC, which was smaller than the above-calculated 1.26 pC. Furthermore, when the applied voltage was 7 V, the response time was 250 μs.

Such a liquid crystal panel 21 of Example 1 was combined with the above-described back-light 22, and a color image was displayed by the field-sequential method with the circuit structure shown in FIG. 4. In this case, the applied voltage to the liquid crystal was made within a range of 0 to ±7 V As a result, it was possible to realize a high-quality bright display with excellent color purity.

EXAMPLE 2

A liquid crystal panel 21 of Example 2 as shown in FIGS. 5, 6 and 7 was fabricated as follows. After washing the TFT substrate having the pixel electrodes 40 (pixel number: 640×480, electrode area A: 6×10⁻⁵ cm², storage capacity: 0.2 pF, diagonal: 3.2 inches) and the glass substrate 2 having the common electrode 3, they were coated with polyamide and then baked for one hour at 200° C. to form about 200 Å thick polyamide films as the alignment films 11 and 12.

Further, these alignment films 11 and 12 were rubbed with a rayon fabric, and stacked with a gap being maintained therebetween by the spacers 14 made of silica having an average particle size of 1.6 μm so as to fabricate an empty panel. A ferroelectric liquid crystal material based on the specifications of the present invention was sealed in between the alignment films 11 and 12 of this empty panel so as to form the liquid crystal layer 13. The magnitude $P_S$ of spontaneous polarization of the sealed ferroelectric liquid crystal material was 21 nC/cm², and the cone angle 2θ was 66°. The fabricated panel was sandwiched by two polarization films 1 and 5 maintained in a crossed-Nicol state so that a dark state was produced when the ferroelectric liquid crystal molecules of the liquid crystal layer 13 titled to one direction, thereby forming the liquid crystal panel 21.

Figure 11:
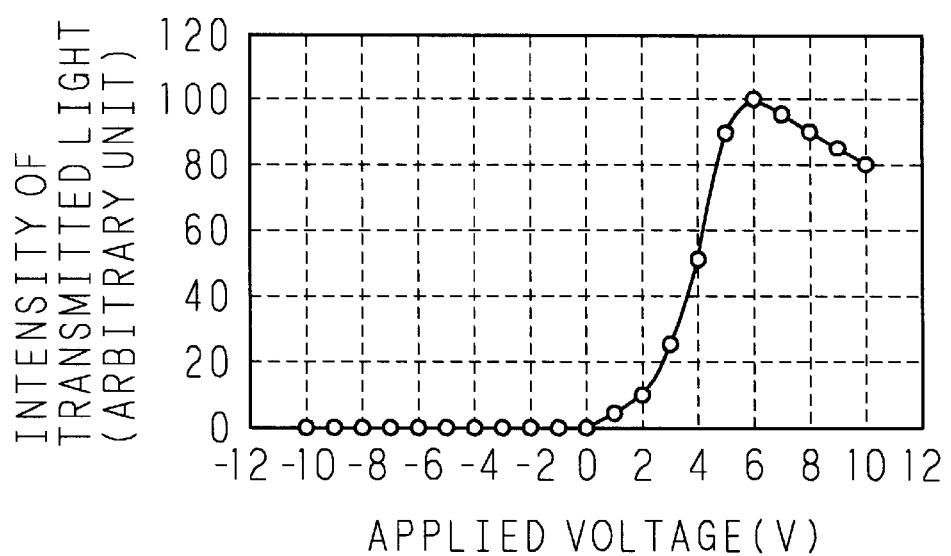
FIG. 11 is a graph showing the applied voltage-transmitted light intensity characteristic according to Example 2.

The graph of FIG. 11 shows the applied voltage-transmitted light intensity characteristic when a voltage was applied to each pixel of the liquid crystal panel 21 thus fabricated through the switching of the TFT 41. The intensity of transmitted light exhibited the maximum when the applied voltage was 6 V It is therefore suitable to drive the liquid crystal by the applied voltage within a range of 0 to 6 V or −6 to 0 V. The charge amount Q injected to each pixel through the switching of the TFT 41 when the voltage of 6 V was applied was calculated 2.28 pC including the amount of the storage capacity. Since the magnitude $P_S$ of spontaneous polarization is 21 nC/cm² and the area A of the pixel electrode 40 is 6×10⁻⁵ cm², $2P_S \cdot A$=2.52 pC, which satisfies $2P_S \cdot A > Q$.

Moreover, when the applied voltage was 6 V, the total charge amount of a current flowing due to the response of the ferroelectric liquid crystal material was measured 1.71 pC, which was smaller than the above-calculated 2.28 pC. Further, when the applied voltage was 6 V, the response time was 140 μs.

Such a liquid crystal panel 21 of Example 2 was combined with the above-described back-light 22, and a color image was displayed by the field-sequential method with the circuit structure shown in FIG. 4. In this case, the applied voltage to the liquid crystal was made within a range of 0 to ±6 V. As a result, it was possible to realize a high-quality bright display with excellent color purity.

COMPARATIVE EXAMPLE 1

A liquid crystal panel 21 was fabricated in exactly the same manner as in Example 1 except that a ferroelectric liquid crystal material based on conventional art was sealed in between the alignment films 11 and 12. The magnitude $P_S$ of spontaneous polarization of the sealed ferroelectric liquid crystal material was 10 nC/cm², and the cone angle 2θ was 40°. The fabricated panel was sandwiched by two polarization films 1 and 5 maintained in a crossed-Nicol state so that a dark state was produced when the ferroelectric liquid crystal molecules of the liquid crystal layer 13 titled to one direction, thereby forming the liquid crystal panel 21.

Figure 12:
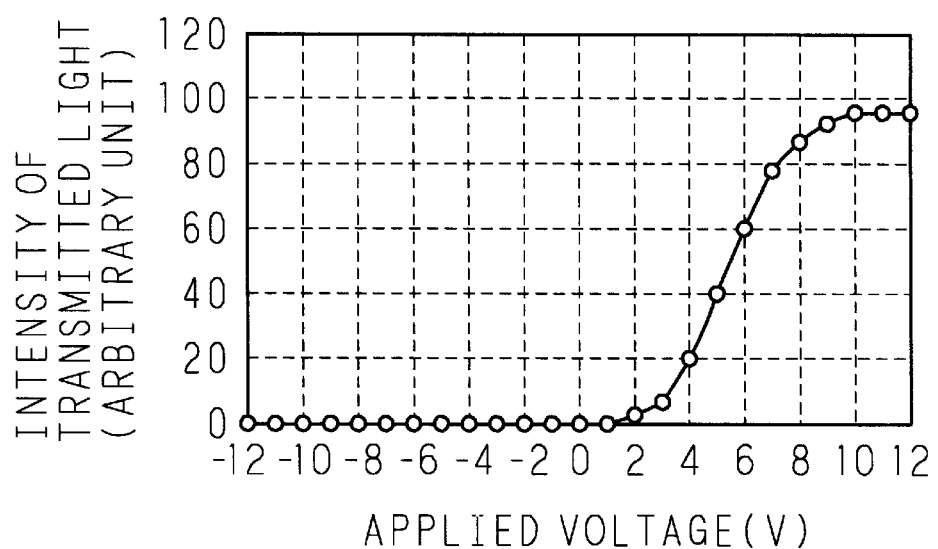
FIG. 12 is a graph showing the applied voltage-transmitted light intensity characteristic according to Comparative Example 1.

The graph of FIG. 12 shows the applied voltage-transmitted light intensity characteristic when a voltage was applied to each pixel of the liquid crystal panel 21 thus fabricated through the switching of the TFT 41. There is no portion where the intensity of transmitted light exhibited the maximum, and the highest intensity of transmitted light was obtained at a high applied voltage of 10 V. In addition, the highest value of the intensity of transmitted light is smaller than the maximum values of Examples 1 and 2.

The charge amount Q injected to each pixel through the switching of the TFT 41 when the voltage of 10 V was applied was calculated 1.80 pC. Since the magnitude $P_S$ of spontaneous polarization is 10 nC/cm² and the area A of the pixel electrode 40 is 6×10⁻⁵ cm², $2P_S \cdot A$=1.20 pC, which satisfies $2P_S \cdot A \leq Q$. Further, when the applied voltage was 10 V, the response time was 240 μs.

COMPARATIVE EXAMPLE 2

A liquid crystal panel 21 was fabricated in exactly the same manner as in Example 1 except that a ferroelectric liquid crystal material based on conventional art was sealed in between the alignment films 11 and 12. The magnitude $P_S$ of spontaneous polarization of the sealed ferroelectric liquid crystal material was 5 nC/cm², and the cone angle 2θ was 38°. The fabricated panel was sandwiched by two polarization films 1 and 5 maintained in a crossed-Nicol state so that a dark state was produced when the ferroelectric liquid crystal molecules of the liquid crystal layer 13 titled to one direction, thereby forming the liquid crystal panel 21.

Figure 13:
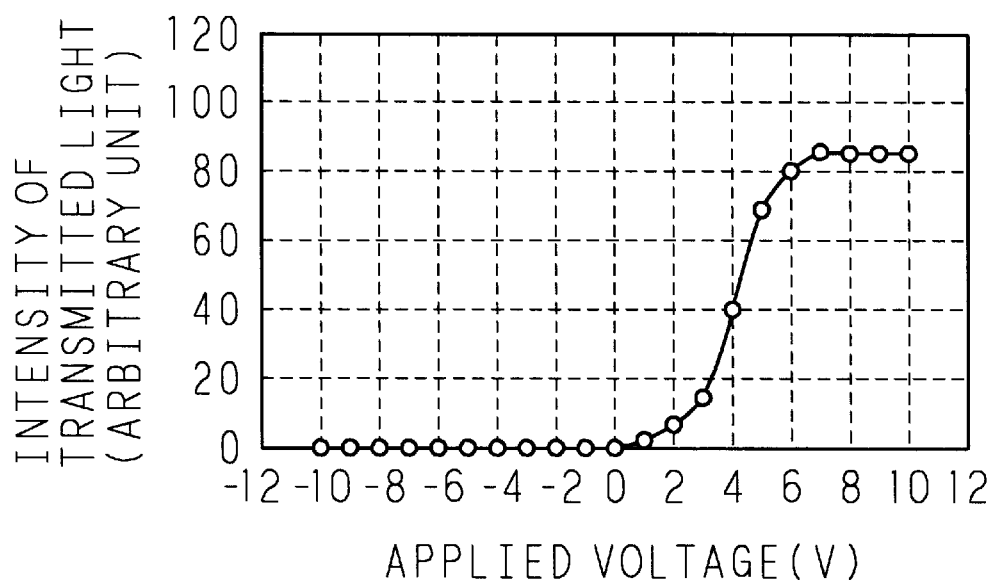
FIG. 13 is a graph showing the applied voltage-transmitted light intensity characteristic according to Comparative Example 2.

The graph of FIG. 13 shows the applied voltage-transmitted light intensity characteristic when a voltage was applied to each pixel of the liquid crystal panel 21 thus fabricated through the switching of the TFT 41. There is no portion where the intensity of transmitted light exhibited the maximum, and the highest intensity of transmitted light was obtained at a low applied voltage of 7 V. However, the highest value of the intensity of transmitted light is smaller than the maximum values of Examples 1 and 2.

The charge amount Q injected to each pixel through the switching of the TFT 41 when the voltage of 7 V was applied was calculated 1.26 pC. Since the magnitude $P_S$ of spontaneous polarization is 5 nC/cm² and the area A of the pixel electrode 40 is 6×10⁻⁵ cm², $2P_S \cdot A$=0.60 pC, which satisfies $2P_S \cdot A \leq Q$. Further, when the applied voltage was 7 V, the response time increased to 510 μs.

Note that, in the above-described examples, while, a ferroelectric liquid crystal is used as the liquid crystal material having spontaneous polarization, it is, of course, possible to use an antiferroelectric liquid crystal, and the ferroelectric liquid crystal may be of either monostable type or bistable type.

Moreover, in the above-described examples, while a color image is displayed by the field-sequential method using a light source for each of R, G and B, it is also possible to use a single light source capable of emitting light by switching R, G and B, and, of course, it is further possible to apply the present invention in the same manner to a structure for displaying a color image by using a color filter.

As described above, in the present invention, since the maximum charge amount injected to each pixel by the switching of the switching element satisfies a condition that the maximum charge amount is smaller than the total charge amount of a switching current per pixel resulting from complete reversal of spontaneous polarization of the liquid crystal material, i.e., the condition $2P_S \cdot A > Q$, it is possible to use a liquid crystal material having large spontaneous polarization and also realize a high-speed response and low-voltage driving.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A liquid crystal display device comprising:
   two substrates facing each other;
   a liquid crystal material having spontaneous polarization, sealed in between said substrates; and
   a plurality of electrodes and switching elements provided on an inner face of one of said substrates so that said electrodes and switching elements correspond to pixels, respectively,
   wherein a maximum charge amount injected to each of said pixels by switching of each of said switching elements is smaller than a total charge amount of a switching current per each pixel resulting from complete reversal of spontaneous polarization of said liquid crystal material.

2. The liquid crystal display device of claim 1, wherein a cone angle of said liquid crystal material is not smaller than 45°.

3. The liquid crystal display device of claim 1, wherein said liquid crystal material is a ferroelectric liquid crystal material.

4. The liquid crystal display device of claim 1, wherein a storage capacity is provided on a liquid crystal material driving electrode side of each of said switching elements.

5. The liquid crystal display device of claim 1, wherein a change of an optical axis of said liquid crystal material during driving is not greater than 45°.

6. The liquid crystal display device of claim 1, wherein said liquid crystal material is driven within an applied voltage range of 0 to ±V, where V is an applied voltage to said liquid crystal material when a light-transmittance of said liquid crystal material is maximum.

7. The liquid crystal display device of claim 6, wherein if a charge amount injected to each of said pixels is denoted as q when said applied voltage is +V or −V a total charge amount of a current flowing due to a response of said liquid crystal material resulting from said applied voltage +V or −V is not more than q.

8. The liquid crystal display device of claim 1, further comprising a back-light having a light source for emitting light of two or more colors,
   wherein a color image is displayed by switching the colors of emitted light of said light source in a time-divided manner in synchronism with on/off driving of said switching elements.

9. A liquid crystal display device comprising:
   two substrates facing each other;
   a liquid crystal material having spontaneous polarization, sealed in between said substrates; and
   a plurality of electrodes and switching elements provided on an inner face of one of said substrates so that said electrodes and switching elements correspond to pixels, respectively,
   wherein said liquid crystal display device satisfies a relation $2P_S \cdot A > Q$, where Q is a maximum charge amount injected to each of said pixels by switching of each of said switching elements, A is an area of each of said electrodes, and $P_S$ is a magnitude of said spontaneous polarization per unit area.

10. The liquid crystal display device of claim 9, wherein a cone angle of said liquid crystal material is not smaller than 45°.

11. The liquid crystal display device of claim 9, wherein said liquid crystal material is a ferroelectric liquid crystal material.

12. The liquid crystal display device of claim 9, wherein a storage capacity is provided on a liquid crystal material driving electrode side of each of said switching elements.

13. The liquid crystal display device of claim 9, wherein a change of an optical axis of said liquid crystal material during driving is not greater than 45°.

14. The liquid crystal display device of claim 9, wherein said liquid crystal material is driven within an applied voltage range of 0 to ±V, where V is an applied voltage to said liquid crystal material when a light-transmittance of said liquid crystal material is maximum.

15. The liquid crystal display device of claim 14, wherein if a charge amount injected to each of said pixels is denoted as q when said applied voltage is +V or −V, a total charge amount of a current flowing due to a response of said liquid crystal material resulting from said applied voltage +V or −V is not more than q.

16. The liquid crystal display device of claim 9, further comprising a back-light having a light source for emitting light of two or more colors,
   wherein a color image is displayed by switching the colors of emitted light of said light source in a time-divided manner in synchronism with on/off driving of said switching elements.

* * * * *